(12) United States Patent
Sidler (10) Patent No.: US 9,669,943 B2
(45) Date of Patent: Jun. 6, 2017

(54) ARRANGEMENT FOR ILLUMINATING AN AIRCRAFT FUSELAGE

(75) Inventor: Joane Andre Sidler, Brisbane (AU)

(73) Assignee: Concept Ideas Pty Ltd, Brisbane (AU)

( * ) Notice: Subject to any disclaimer, the term of this patent is extended or adjusted under 35 U.S.C. 154(b) by 886 days.

(21) Appl. No.: 13/061,641

(22) PCT Filed: Jan. 23, 2009

(86) PCT No.: PCT/AU2009/000073
§ 371 (c)(1),
(2), (4) Date: Apr. 6, 2011

(87) PCT Pub. No.: WO2010/025490
PCT Pub. Date: Mar. 11, 2010

(65) Prior Publication Data
US 2011/0188257 A1   Aug. 4, 2011

(30) Foreign Application Priority Data

Sep. 2, 2008 (AU) ................................ 2008904551

(51) Int. Cl.
| | | |
|---|---|---|
| *G03B 21/00* | (2006.01) | |
| *B64D 47/02* | (2006.01) | |
| *G09F 19/18* | (2006.01) | |
| *G09F 21/10* | (2006.01) | |

(52) U.S. Cl.
CPC .............. *B64D 47/02* (2013.01); *G09F 19/18* (2013.01); *G09F 21/10* (2013.01)

(58) Field of Classification Search
CPC .......... B64D 47/02; G09F 19/18; G09F 21/10
USPC ........ 362/470, 471, 472; 353/13; 244/117 R, 244/129.1; 434/372; D20/35
See application file for complete search history.

(56) References Cited

U.S. PATENT DOCUMENTS

| | | | | | |
|---|---|---|---|---|---|
| 1,511,795 | A | * | 10/1924 | Batt ............................... | 40/212 |
| 1,698,721 | A | | 5/1926 | Hand | |
| 1,695,078 | A | * | 12/1928 | Barker ........................... | 40/212 |
| 2,099,362 | A | * | 11/1937 | Harley .......................... | 362/472 |
| 4,736,907 | A | * | 4/1988 | Steffen .......................... | 244/1 R |
| 5,690,408 | A | * | 11/1997 | de la Pena et al. .......... | 362/556 |
| 5,813,744 | A | * | 9/1998 | Altebarmakian ............. | 362/470 |
| 5,918,924 | A | * | 7/1999 | Cowan .......................... | 296/21 |
| 7,175,321 | B1 | * | 2/2007 | Lopez ............................ | 362/496 |

(Continued)

FOREIGN PATENT DOCUMENTS

| | | |
|---|---|---|
| CN | 1920906 | 2/2007 |
| DE | 510 162 | 12/1932 |

(Continued)

*Primary Examiner* — Nimeshkumar Patel
*Assistant Examiner* — Jacob R Stern
(74) *Attorney, Agent, or Firm* — Hamre, Schumann, Mueller & Larson, P.C.

(57) ABSTRACT

An apparatus for illuminating an underside of a fuselage of an aircraft, the apparatus comprising a housing mounted to an underside of the fuselage; and a light source disposed within the housing the housing being configured to direct light from the light source toward the underside of the fuselage in an aft direction. Also disclosed is an aircraft advertising arrangement, comprising light emanation means for causing light to emanate from an underside of an aircraft fuselage, the light emanation means being configured to emanate light as a graphical advertising image.

20 Claims, 9 Drawing Sheets

(56) References Cited

U.S. PATENT DOCUMENTS

| | | | |
|---|---|---|---|
| 2002/0196637 A1* | 12/2002 | Dubin et al. | 362/470 |
| 2003/0086251 A1* | 5/2003 | Hamilton et al. | 362/12 |
| 2003/0107899 A1* | 6/2003 | Barnhart et al. | 362/472 |
| 2004/0130900 A1 | 7/2004 | Ganzer et al. | |
| 2005/0213342 A1* | 9/2005 | Tufte | G09F 13/20 362/551 |
| 2007/0109799 A1* | 5/2007 | Kaeser et al. | 362/428 |
| 2008/0158012 A1* | 7/2008 | Hagan | 340/961 |

FOREIGN PATENT DOCUMENTS

| | | |
|---|---|---|
| GB | 249541 | 5/1927 |
| GB | 436865 | 10/1935 |
| GB | 1 347 276 | 2/1974 |

* cited by examiner

ARRANGEMENT FOR ILLUMINATING AN AIRCRAFT FUSELAGE

TECHNICAL FIELD

The described embodiments relate to methods, apparatus and lighting arrangements for illuminating the underside of an aircraft fuselage.

BACKGROUND

Aircraft are generally required to have external lights. External lights, such as navigation lights can assist in making the heading and location of aircraft more visible to observers while the aircraft is in flight. Navigation lights are generally located toward the wing tips and on an aft portion of the aircraft. External lights such as navigation lights are, however, limited in their usefulness in illuminating surfaces of the aircraft on which they are located.

It is desired to address or ameliorate one or more inadequacies or disadvantages associated with existing aircraft lighting techniques and/or use of visible underside surfaces of an aircraft, or to at least to provide a useful alternative thereto.

SUMMARY

Described embodiments relate generally to methods, systems arrangements and apparatus that involve emanation of light from an underside of an aircraft fuselage. Such emanation may be for the purpose of making visible a graphical advertisement image, for example.

Some described embodiments relate to an aircraft advertising arrangement comprising light emanation means for causing light to emanate from an underside of an aircraft fuselage, wherein the light emanation means is configured to emanate light as a graphical advertisement image.

The light emanation means may comprise an electroluminescent light source and a power source for supplying power to the electroluminescent light source. The light emanation means may alternatively comprise a reflective material disposed on the underside of the fuselage. The light emanation means may comprise at least one light source configured to impinge light on the reflective material. The at least one light source may be mounted on the underside of the fuselage. The at least one light source may comprise multiple light sources mounted at spaced locations on the underside of the fuselage. The at least one light source may be directed in an aft direction.

The arrangement may comprise a switch for controlling supply of power to the light emanation means. The switch may also control supply of power to external lights, such as the navigation lights of the aircraft. The arrangement may also comprise a controller responsive to the switch for controlling strobing of the light emanation means.

According to some embodiments, the light emanation means may comprise a phosphorescent material. According to some embodiments, the light emanation means may comprise a retroreflective material disposed on the underside of the fuselage to reflect light originating from ground-based or ambient light sources impinging on the underside of the fuselage.

Other embodiments relate to a method of advertising, wherein the method comprises causing light to emanate from an underside of an aircraft fuselage, the light emanating as a graphical advertisement image. The method may be performed using any of the arrangements described herein.

The causing may comprise directing light from at least one light source to impinge on the underside of the fuselage. The causing may comprise providing a retroreflective material on the underside of the fuselage to reflect light originating from ground-based light sources.

Some embodiments relate to an aircraft comprising any of the advertising or lighting arrangements described herein.

Other embodiments relate to an apparatus for illuminating an underside of a fuselage of the aircraft. The apparatus comprises a housing mounted to an underside of the fuselage and a light source disposed within the housing. The housing is configured to direct light from the light source towards the underside of the fuselage in an aft direction.

The apparatus may further comprise a switching control component for controlling switching of the light source between an on state and an off state. The switching control component may be configured to switch the light source to an on state in response to a signal to switch on aircraft external lights, such as navigation lights of the aircraft. The switching control component may be configured to strobe the light source in the on state.

The housing may have a light-transmissive protective cover through which the light source is projected. The apparatus may further comprise a lens positioned intermediate the light source and the protective cover for focusing light from the light source towards the underside of the fuselage.

The apparatus may further comprise an adjustment mechanism for adjusting an angle of projection of the light source. The adjustment mechanism can adjust the angle of projection of the light source within a small range more or less toward the underside of the fuselage.

Some embodiments relate to an aircraft advertising system. The system comprises a graphical advertisement applied to an underside of an aircraft fuselage and at least one lighting device. Each lighting device comprises a housing fixedly mounted to the fuselage and a light source disposed within the housing. The housing is configured to direct light from the light source towards the underside of the fuselage to illuminate the graphical advertisement.

The graphical advertisement may be projected onto the underside of the fuselage by the at least one lighting device. Alternatively, the graphical advertisement may be comprised in material affixed to the underside of the fuselage. The material may comprise a luminescent material, an electroluminescent material or a retroreflective material, for example.

At least some of the described embodiments relate to apparatus for illuminating an underside of a fuselage of an aircraft. The apparatus comprises an anchor fixedly mounted to an underside of the fuselage and a lighting portion. The lighting portion is coupled to the anchor and comprises a light source and a housing. The housing is configured to direct light from the light source towards the underside of the fuselage in an aft direction. The anchor may be mounted at a central forward location on the underside of the fuselage.

The lighting portion may be movable between a retracted position and an extended position. The apparatus may comprise a biasing element coupled to the lighting portion to bias the lighting portion toward the extended or retracted position.

The apparatus may further comprise a control mechanism including a positioning device for moving the lighting portion between the extended position and the retracted position. The positioning device may be actuable to move the lighting portion in response to a control signal. The apparatus may further comprise a locking arrangement for retaining the lighting portion in the retracted position. The locking arrangement may comprise a locking mechanism having a pressure and/or temperature and/or speed-sensitive element configured to cause the locking mechanism to lock or unlock when air pressure and/or temperature and/or speed around the apparatus is below or above a predetermined pressure and/or temperature and/or speed.

A biasing force of the biasing element may be selected to retain the lighting portion in the extended position up to a predetermined wind speed, such that when the lighting portion is subjected to wind speeds above the predetermined wind speed, air pressure forces associated with the wind speed cause the lighting portion to tend to move toward the retracted position.

The light source may comprise a plurality of light emitting diodes (LEDs). The apparatus may further comprise a switching control component for controlling switching of the light source between an on state and an off state.

Other embodiments relate to an aircraft comprising the apparatus described above.

BRIEF DESCRIPTION OF THE DRAWINGS

Embodiments are described below in further detail, and by way of example, with reference to the accompanying drawings, in which.

DETAILED DESCRIPTION

Described embodiments relate generally to methods, systems, apparatus and arrangements for emanating light from an underside of an aircraft fuselage. The light may be emanated for the purpose of providing a graphical advertisement image visible from beneath the aircraft. The emanated light may be reflected from another light source, such as a light source mounted on the aircraft or a ground-based light source, or may originate from a material affixed to the underside of the fuselage, such as an electroluminescent or phosphorescent material.

Some embodiments relate to a light source mounted to the underside of the aircraft fuselage and contained within a housing that is movable between an extended position and a retracted position. The extended position may allow the light source to obtain a better angle at which to impinge light upon the fuselage underside for achieving greater reflectance of light therefrom and hence greater visibility of any image displayed on the fuselage underside.

Figure 1:
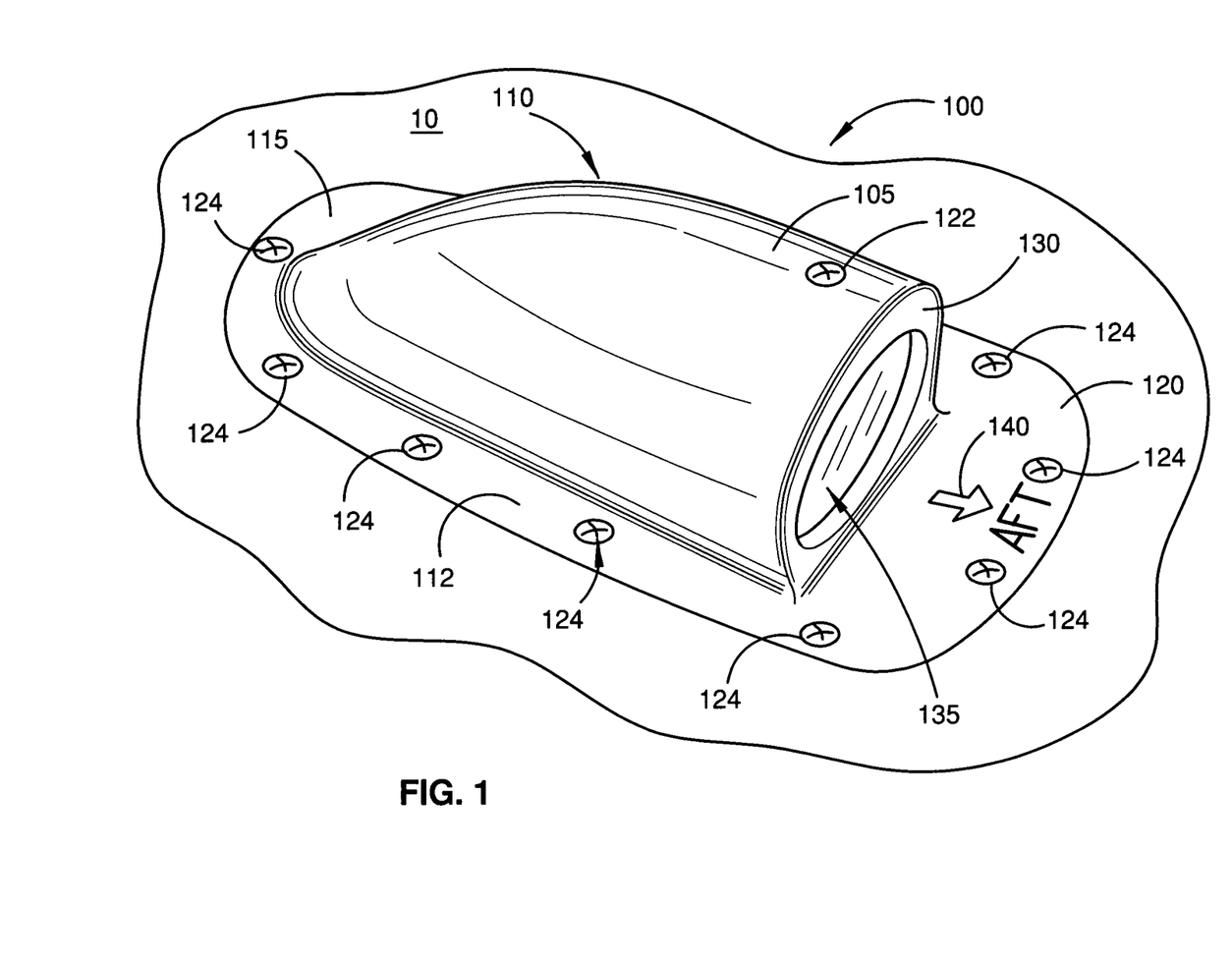
FIG. 1 is a perspective view of a lighting apparatus positioned on an underside of the fuselage of an aircraft.
Figures 2, 3, 4:
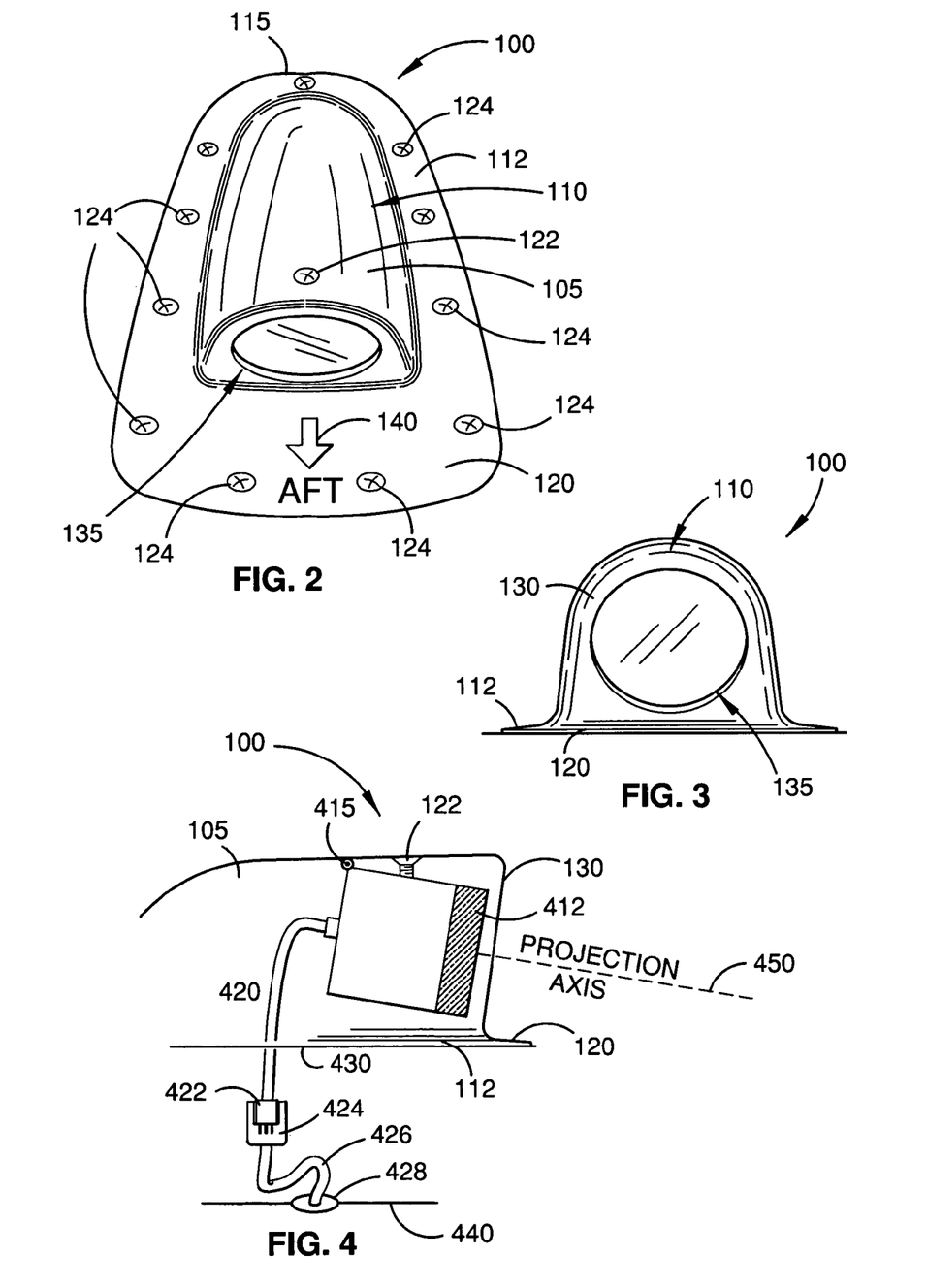
FIG. 2 is a further perspective view of the lighting apparatus of FIG. 1.
FIG. 3 is an end view of the lighting apparatus of FIG. 1, as viewed from an aft direction.
FIG. 4 is a schematic representation of the lighting apparatus of FIG. 1, showing a projection unit.

Referring now to FIGS. 1 to 3, there is shown a lighting apparatus 100 according to some embodiments. Lighting apparatus 100 is intended for direct mounting on the underside of the aircraft fuselage 10 and has an aerodynamically ergonomic housing 110 and a light source, such as a light projector 410 (FIG. 4) housed within housing 110.

Housing 110 has a relatively flat apron-like (or flange-like) portion 112 by which housing 110 can be mounted onto the aircraft fuselage 10 by a mounting means, such as screws 124 or other fasteners suitable for aviation purposes. Flat portion 112 has a forward portion 115 which, in use of lighting apparatus 100, is located in a relatively forward position compared with an aft portion 120 of flat portion 112.

Housing 110 also comprises a curved, somewhat dome-shaped portion 105 that defines a relatively smooth continuous surface with flat portion 112. In use, curved portion 105 protrudes from the surface of the aircraft fuselage 10, while flat portion 112 generally lies flat against fuselage 10. Curved portion 105 increases in cross-section from adjacent the forward portion 115, progressing in the direction of aft portion 120. Curved portion 110 defines a generally aft-facing portion 130 that has an opening 135 through which light is projected towards the underside of fuselage 10 to assist in emanation of a graphical advertisement image therefrom. Aft-facing portion 130 may have an approximately circular or semi-circular profile and opening 135 may be approximately circular or elliptical in shape.

An adjustment mechanism comprising an adjustment screw 122 may be externally accessible on the housing 110 for adjusting a projection angle of the light source through opening 135.

The intended positioning of lighting apparatus 100 relative to the forward and aft directions of the aircraft is indicated by arrow 140 shown in FIGS. 1 and 2, pointing in the aft direction.

Referring also to FIG. 4, the light projector 410 is described in further detail. Light projector 410 is illustrated schematically within housing 110 as being positioned and orientated to have a somewhat downwardly angled projection axis 450 so that most of the light emitted from projector 410 is directed to impinge on the underside of fuselage 10.

Light source 410 may be pivotally mounted within housing 110 so as to pivot relative to a pivot point 415 fixed within housing 110 so that the adjustment mechanism, such as adjustment screw 122, can adjust the angle of projection axis 450 so as to be more or less acute (i.e. a shallower or steeper angle relative to the surface of fuselage 10). Suitable mounting means (not shown) is included within housing 110 to enable light projector 410 to remain fixed in position, while allowing some angular displacement about pivot point 415.

Light projector 410 receives power from the aircraft via a power supply cable 420 that passes through a hole in the fuselage outer surface layer 430. Power cable 420 may be coupled to another cable 426 via a plug 422 and socket 424 arrangement, where cable 426 passes through the pressure hull 440 of the aircraft. Cable 426 may be sealed via a pressure seal 428 where it passes through pressure hull 440. Cable 426 is coupled to a power supply (not shown) via a switch (not shown) that is actuable from the cockpit of the aircraft. The same switch as is used to control power to the aircraft external lights, such as navigation lights and other outwardly directed lights of the aircraft, may be used to control power to lighting apparatus 100 via power cables 426, 420. Alternatively, a dedicated actuator and switch control may be used for switching power to lighting apparatus 100.

Lighting apparatus 100 may optionally be configured to include an image generator (not shown) for providing one or more images or sequences of images for projection onto the underside of fuselage 10 using light projector 410. The image generator may communicate with light projector 410 via a communications cable (not shown) running along with power supply cable 420.

In some embodiments, the switch may be used in combination with a controller to control strobing of light projector 410. The controller may be located within the aircraft in a suitable location and may provide suitable switching signals to light projector 410 to cause a strobing effect. Alternatively, the controller may be located with light projector 410 to control the strobing, in which case the controller may receive control signals from a switch actuable from within the cockpit.

In some embodiments, light projector 410 may comprise more than one type of light source, such as light emitting diodes (LEDs) and/or xenon flash tubes. Such light sources may be white light sources, for example. Where the light projector 410 comprises more than one type of light source, each separate light source may be controllable independently of the other. For example, if light projector 410 comprises LEDs and strobe lights, the LEDs may be continuously on while lighting apparatus 100 is switched on, but the strobe lights may be caused to periodically switch on and off.

Light projector 410 may comprise an optical output element 412 comprising a protective screen (not shown) and optionally a lens (not shown) and a projection screen or mask (not shown). The lens may be used to focus light from light sources within light projector 410 so that the beam of light emerging from opening 135 is shaped to optimally impinge upon the material positioned on the underside of the fuselage from which light is to emanate as the graphical advertisement. In some embodiments, the screen or mask within optical output element 412 may be used to either shape the beam projected from light projector 410 or to project a specific image onto the underside of the aircraft fuselage 10.

Figure 5:
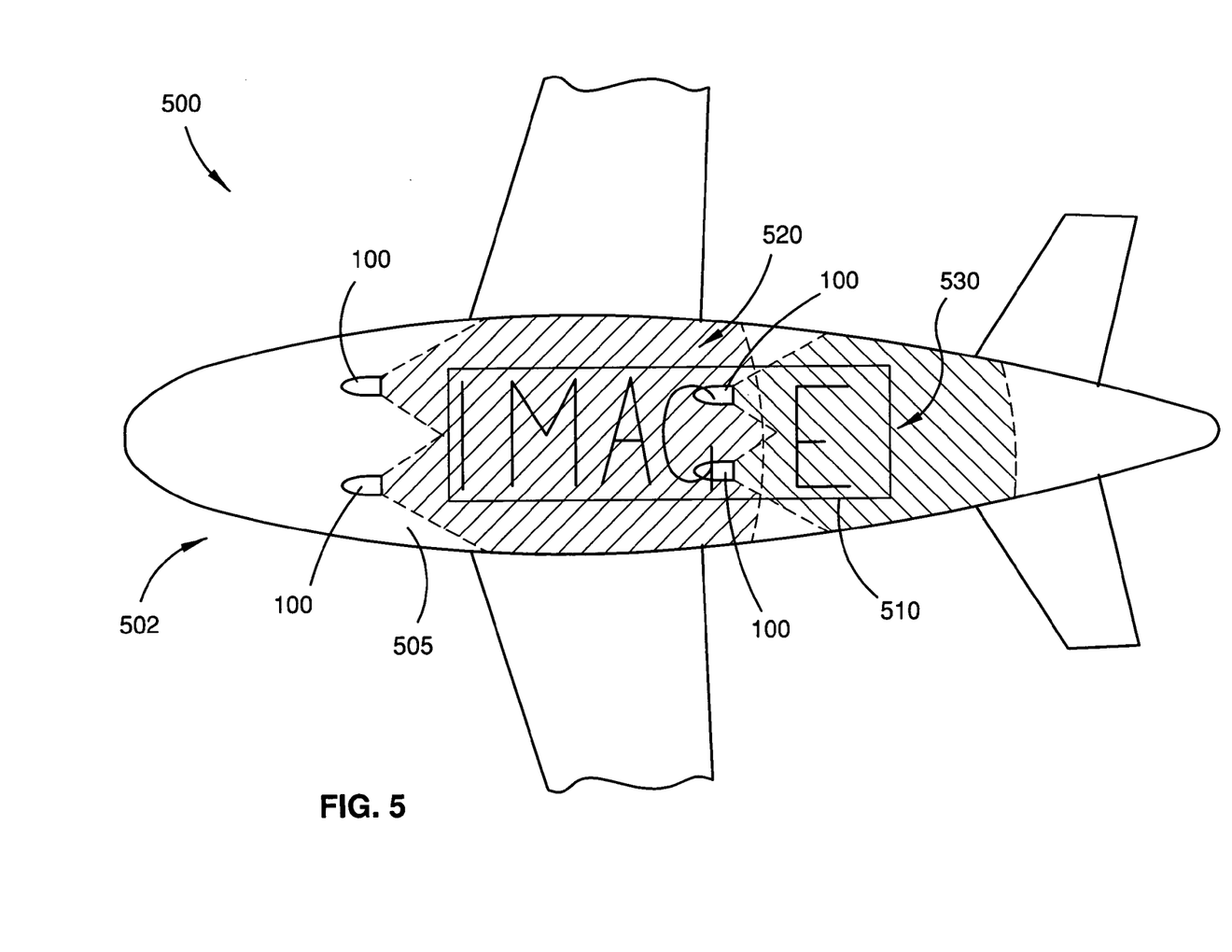
FIG. 5 is a schematic representation of a lighting arrangement for an underside of an aircraft fuselage.

Referring now to FIG. 5, an illustrative example of a lighting arrangement 500 is shown and described in further detail, in which multiple lighting apparatuses 100 are used to illuminate a graphical image 510 on the underside 505 of the fuselage of an aircraft 502. Lighting apparatuses 100 are used to project light onto underside 505 of aircraft 502 in order to cause light reflected from the image 510 to be emanated away from aircraft 502 and thereby make image 510 visible to observers having a line of sight to underside 505.

Lighting apparatuses 100 may be arranged at spaced locations on underside 505 so that a large central portion of the underside 505 of the fuselage is illuminated. For example, two lighting apparatuses 100 may be positioned in a relatively forward location and side by side, but separated by several feet, to illuminate a first area 520. Further lighting apparatuses 100 may be located in a more aft position side by side, but separated by several feet, to illuminate a second area 530 of the underside 505 of the fuselage. The first and second areas 520, 530 may substantially overlap so that, for an image 510 that extends across the first and second areas 520, 530, the image 510 is substantially entirely illuminated by the lighting apparatuses 100.

Although arrangement 500 illustrates more than one lighting apparatus 100 on the underside 505 of the fuselage, a single lighting apparatus 100 may be employed instead.

Image 510 may be formed on underside 505 by painting or use of a decal, for example, which may comprise highly reflective and/or retroreflective materials.

Referring now to FIGS. 6, 7, 8A to 8D, 9, 10, 11A, 11B, 12A, 12B, 13A and 13B, further embodiments of a lighting apparatus 600 are shown and described in further detail. Lighting apparatus 600 is similar to lighting apparatus 100 in that it is intended to illuminate a part of the underside of the fuselage of an aircraft. However, lighting apparatus 600 differs in that it comprises a fixed base portion 605 coupled to a moveable arm 610 via a coupling mechanism 615 that allows arm 610 to pivot between extended and retracted positions. In the extended position, a light source 660 positioned at one end of the moveable arm 610 projects a beam 668 onto the underside of the aircraft fuselage for illumination purposes. In the retracted position, the lighting apparatus does not illuminate the underside of the fuselage and the light source is switched off.

Figure 6:
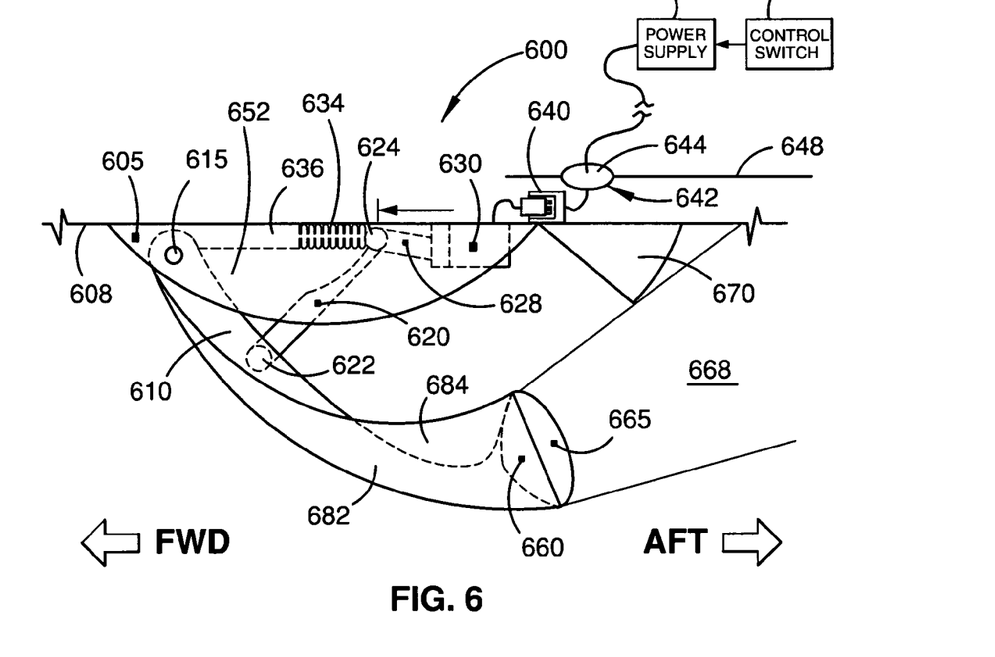
FIG. 6 is a schematic side view of an alternative lighting apparatus positioned on an underside of the fuselage of an aircraft, the lighting apparatus being shown in an extended position.
Figure 7:
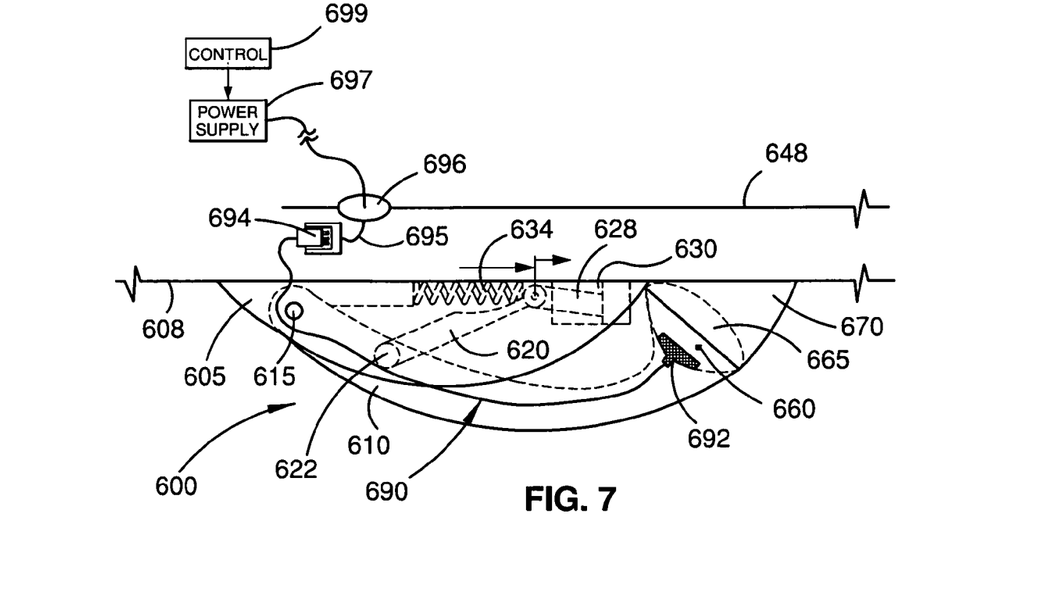
FIG. 7 is a schematic side view of the lighting apparatus of FIG. 6, shown in a retracted position.

Lighting apparatus 600 is mounted to the fuselage outer surface layer 608 by a suitable mounting mechanism, such as screws 613 that secure a mounting flange 612 of the lighting apparatus 600 to surface 608.

An electromechanical control mechanism may be comprised in lighting apparatus 600 to control extension and retraction of moveable arm 610. The control mechanism may comprise a coupling arm 620 coupled to moveable arm 610 at a rotatable coupling 622 and coupled to an actuator arm 628 at a rotatable coupling 624. Actuator arm 628 may be actuated by energising an actuator 630, such as a solenoid, electric motor or hydraulic or pneumatic driver, to extend actuator arm 628. Extension of actuator arm 628 also causes compression of a spring 634 or other biasing mechanism, coupled to actuator arm 628. Spring 634 is coupled to actuator arm 628 at one end and to a fixed base portion 636 at its other end.

Upon actuator 630 being energized, actuator arm 628 extends, causing compression of spring 634 and causing coupling arm 620 to push moveable arm 610 away from the fixed based portion 605, thereby causing moveable arm 610 to move towards the extended position by pivoting about coupling 615.

Actuator 630 can be energised by a power (or pneumatic or hydraulic) supply 650 located behind the pressure hull 648 in response to a control switch 651. Power may be supplied to actuator 630 via a cable 642 passing through a pressure seal 644 in pressure hull 648 and coupled to actuator 630 via an electrical coupling 640 that has conductors passing through surface 608 to actuator 630. Control switch 651 can be used to de-energise or otherwise control actuator 630 to return movable arm 610 to the retracted position.

In the event of failure of actuator 630, spring 634 operates to push against actuating arm 628 so that it retracts within actuator 630, thereby causing rotatable coupling 624 to move away from coupling 615, causing coupling arm 620 to bring moveable arm 610 to the retracted position, as shown in FIG. 7. The control mechanism of lighting apparatus 600 is therefore fail-closed (i.e. fails toward the retracted position).

Although not shown, lighting apparatus 600 may further comprise one or more sensors for detecting whether moveable arm 610 is in the extended or retracted position or somewhere in between. Such sensors may be used to determine whether the moveable arm 610 has failed to fully extend or retract, for example where some form of obstruction prevents full extension or retraction of moveable arm 610. Lighting apparatus 600 may further comprise one or more pressure sensors (not shown), such as an altimeter, or a direct electronic, digital feed of pressure related input from the aircraft's altitude displaying equipment, configured to provide input to a control mechanism 699 or control switch 651 to initiate retraction of movable arm 610 above a certain altitude, such as 10,000 feet, for example. Lighting apparatus 600 may further comprise, or receive input from, other sensors, such as temperature sensors or speed sensors, for enabling control mechanism 699 to determine, based on predetermined thresholds of the sensed variables, whether the aircraft is likely to be outside of visible range from the ground so that movable arm 610 can be retracted.

As shown in FIG. 7, a current may be provided to light source 660 via supply cable 690 that is coupled to a power supply 697 via an electrical coupling 694 located intermediate outer fuselage surface 608 and pressure hull 648. A further cable 695 may be coupled between power supply 697 and electrical coupling 694, passing through a pressure seal 696 in pressure hull 648. Cable 690 may be coupled to light source 660 via an electrical connector or coupling 692 positioned at the end of the moveable arm 610 at which light source 660 is located.

Lighting apparatus 600 may optionally be configured to include an image generator (not shown) for providing one or more images or sequences of images for projection onto the underside of the fuselage using light source 660. The image generator may communicate with light source 660 via a communications cable (not shown) running along with power supply cable 690.

Figure 16:
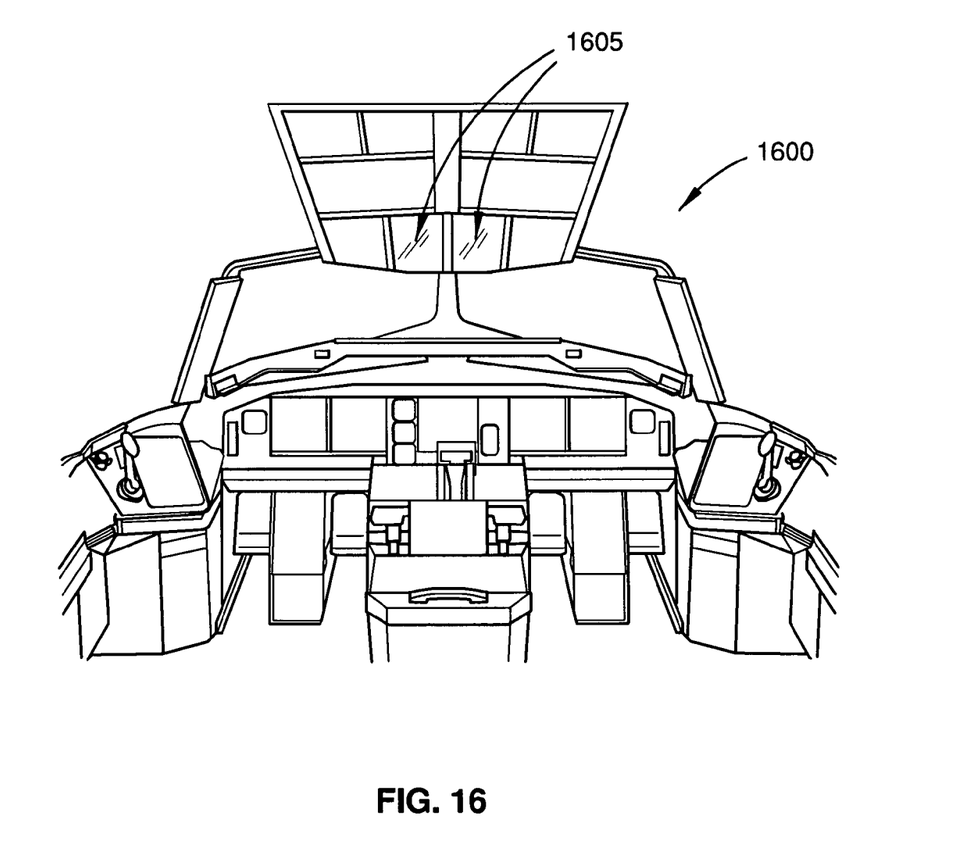
FIG. 16 is a partial schematic diagram showing overhead panels within a cockpit.

Control mechanism 699 may be provided for, among other things, controlling supply of power to light source 660 from power supply 697. Control mechanism 699 may receive inputs from any position sensors on or associated with lighting apparatus 600 so that, when such position sensors indicate that moveable arm 610 is in the fully retracted position, power to light source 660 is switched off. Control mechanism 699 may also receive inputs from any air pressure sensors or other environmental sensors to initiate retraction of movable arm 610. Power supply 697 may be the same power supply as power supply 650 or may derive power from the same power source. Further, control switch 651 may comprise part of control mechanism 699. Control mechanism 699 may comprise a suitable controller (not shown) and may comprise one or more manual switches located internally of the aircraft, for example on one or more overhead panels 1605 in the cockpit 1600, as shown in FIG. 16. The manual switches that control lighting apparatus 600 may also function to switch on or off the aircraft external lights, such as the navigation lights of the aircraft.

Lighting apparatus 600 is generally orientated so as to direct light beam 668 in an aft direction so that most of the light emitted from light source 660 impinges on the underside of the fuselage. Accordingly, moveable arm 610 extends from a relatively forward position at which it is anchored within base portion 605 at coupling 615, arching in a generally aft direction towards a distal end at which light source 660 and optical output element 665 is located.

In some embodiments, light source 660 may comprise more than one type of light source, such as light emitting diodes (LEDs) and/or xenon flash tubes. Such light sources may be white light sources, for example. Where the light source 660 comprises more than one type of light source, each separate light source may be controllable independently of the other. For example, if light 660 comprises LEDs and strobe lights, the LEDs may be continuously on while lighting apparatus 600 is switched on, but the strobe lights may be caused to periodically switch on and off.

Light source 660 may comprise an optical output element 665 comprising a protective screen (not shown) and optionally one or more lenses (not shown) and a projection screen or mask (not shown). Lenses may be used to focus light from light sources within light source 660 so that the beam of light 668 emerging from optical output element 665 is shaped to optimally impinge upon the material positioned on the underside of the fuselage from which light is to emanate as the graphical advertisement. In some embodiments, the screen or mask within optical output element 665 may be used to either shape the beam 668 projected from light source 660 or to project a specific image onto the underside of the aircraft fuselage.

Figure 8A:
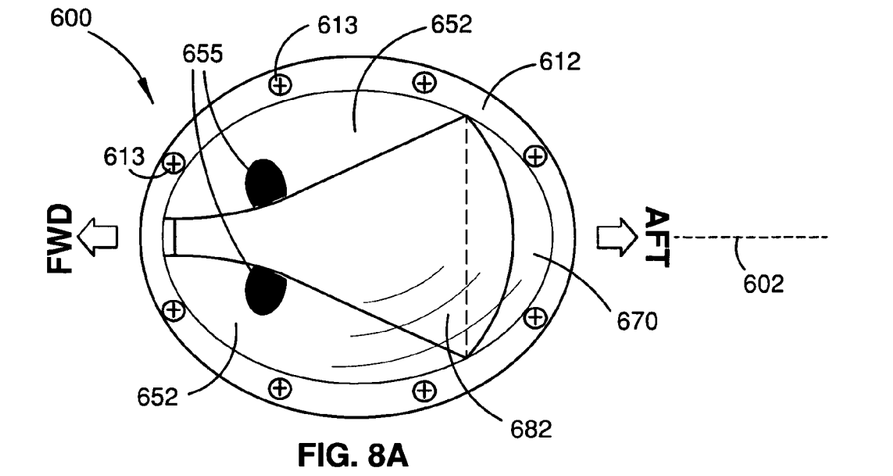
FIG. 8A is a view of the lighting apparatus of FIG. 6, seen from underneath the fuselage of the aircraft, the lighting apparatus being shown in the retracted position.
Figure 8B:
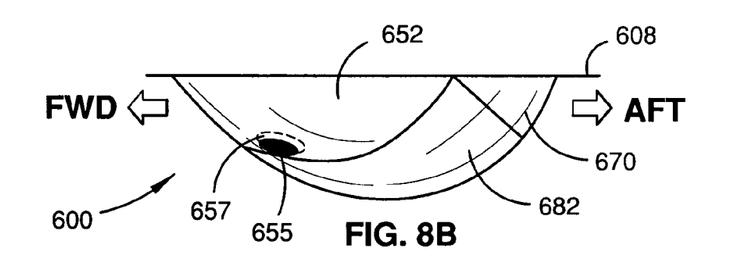
FIG. 8B is a side view of the lighting apparatus of FIG. 6 in the retracted position.
Figure 8C:
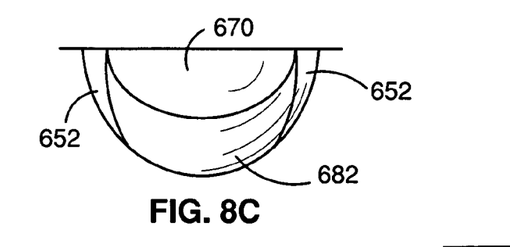
FIG. 8C is an end view of the lighting apparatus of FIG. 6 in the retracted position, seen looking in a forward direction.
Figure 8D:
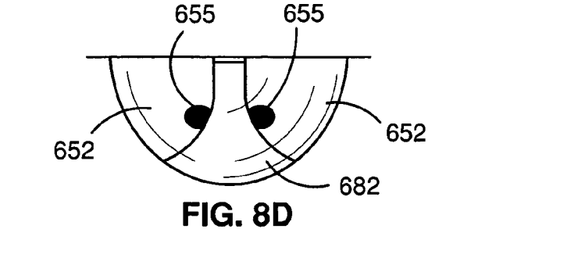
FIG. 8D is an end view of the lighting apparatus of FIG. 6 in the retracted position, seen looking in an aft direction.

Movable arm 610 has a generally arcuate side profile and is configured to have a relatively aerodynamically ergonomic profile, both in the extended and retracted positions, to minimise air resistance during flight. The bottom view of movable arm 610 shown in FIG. 8A illustrates how movable arm 610 widens from adjacent coupling 615, progressing in the aft direction toward the lighting head portion where the light source 660 is located. Moveable arm 610 is also configured to provide a recess 684 on an inside of the arm, adjacent light source 660 to accommodate actuator 630 when moveable arm 610 is in the fully retracted position.

Lighting apparatus 600 further comprises an aft portion 670 with which the light projecting head of moveable arm 610 (including the protective cover and other optical components, such as optical output element 665) nests when moveable arm 610 is in the retracted position. Aft portion 670 may comprise vibration reduction or absorption material and/or cleaning material for cleaning the protective cover.

When moveable arm 610 is in the retracted position, lighting apparatus 600 generally has a closed shell appearance, as is illustrated in FIGS. 8A to 8D, providing relatively smooth continuous contours so as to avoid unnecessary wind resistance. In the retracted position, lighting apparatus 600 has at its more forward extent a shallower angle relative to fuselage surface 608 than the angle at which aft portion 670 meets surface 608 in the more aft extent of lighting apparatus 600. In the retracted position, the curved outer surface 682 of moveable arm 610 lies flush with curved side portions 652 and aft portion 670.

Although not shown in FIGS. 6 and 7 in order to avoid obscuring the control mechanism features depicted therein, lighting apparatus 600 comprises a pneumatic locking mechanism for retaining moveable arm 610 in the retracted position. This pneumatic locking mechanism is shown in further detail in FIGS. 11A, 11B, 12A, 12B, 13A and 13B. The pneumatic locking mechanism relies on lower air pressure at higher altitudes to cause the expansion of bladders 657 to thereby move catch portions 659 into an extended position in which they can be received in recesses 611 formed in the side of moveable arm 610 in a relatively forward portion thereof. Bladders 657 may contain air at atmospheric pressure (i.e. the average air pressure at the Earth's surface) and are sealed to provide a flexible and expandable membrane.

Bladders 657 are nested within suitably shaped hollow side portions 652 and have on an outer side thereof a flexible depressable cap 655 to allow manual compression of bladders 657 to test whether catch portions 659 extend properly. Bladders 657 are nested within side portions 652 and contained by caps 655 so that the only direction in which expansion is possible (when the pressure within bladder 657 is higher than external air pressure) is outwardly toward recesses 611 of support arm 610.

Figure 11A:
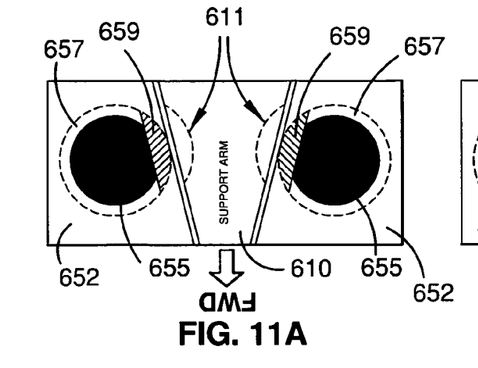
FIG. 11A is a schematic plan view of a section of a lighting apparatus of FIG. 6, illustrating a pneumatic locking mechanism for retaining a moveable arm of the lighting apparatus in the retracted position.
Figure 11B:
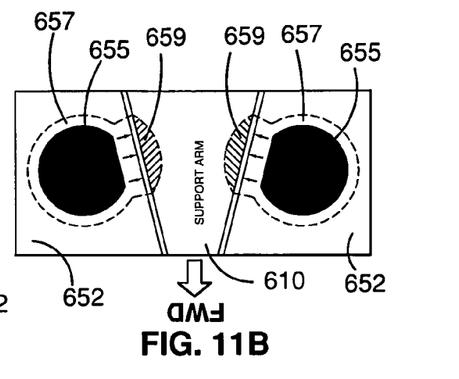
FIG. 11B is a schematic plan view similar to FIG. 11A, but showing the pneumatic locking mechanism in a locking position.
Figure 12A:
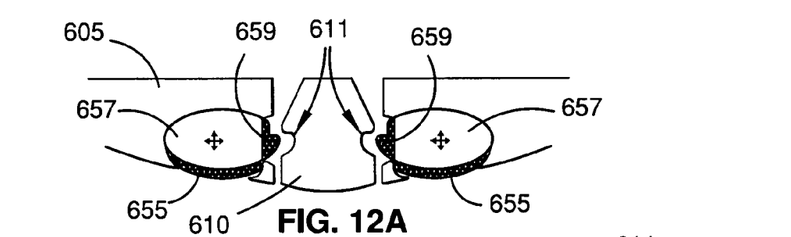
FIGS. 12A and 12B are schematic and cross-sectional views of the lighting apparatus of FIG. 6, showing the pneumatic locking mechanism in unlocked and locking positions, respectively.
Figure 12B:
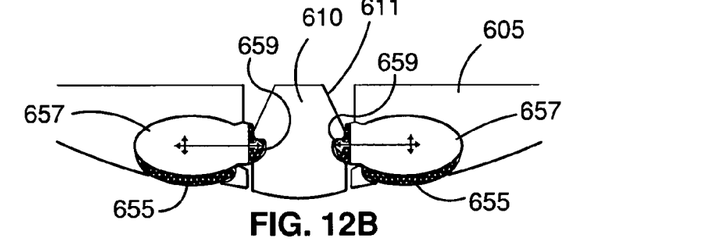
Figure 13A:
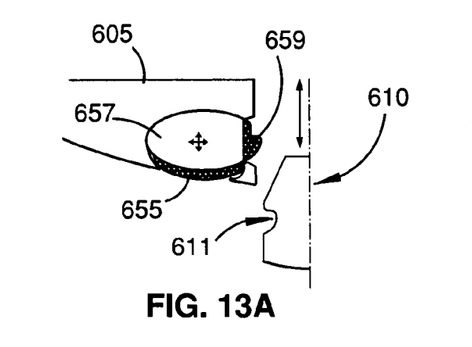
FIGS. 13A and 13B are schematic partial and cross-sectional views of one side of the pneumatic locking mechanism, showing the moveable arm of the lighting apparatus in a partially extended position.
Figure 13B:
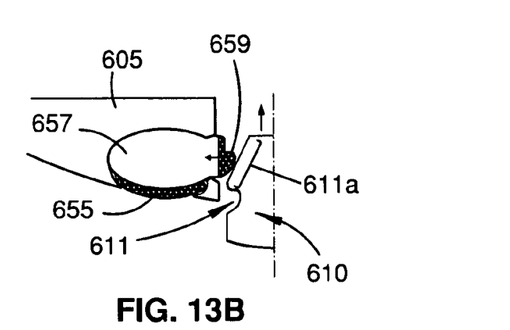

FIGS. 11A, 12A and 13A show bladders 657 in a retracted position, while FIGS. 11B, 12B and 13B show bladders 657 in an expanded position, in which catch portions 659 extend in the direction of movable arm 610. A portion of movable arm 610 adjacent catch portions 659 also has a sloped side portion 611a on an inner side face so that, in the event that the bladder 657 is extended and movable arm 610 is not yet in the retracted position, as shown in FIG. 13B, angled face 611a can push against a complimentary angled face of catch portion 659 to temporarily compress bladder 657 until angled face 611a passes catch portion 659 and is received within recess 611 once moveable arm 610 reaches the retracted position.

The pneumatic locking mechanism provided by bladders 657 in the corresponding locking portions of catch portions 659 and recess 611 of moveable arm 610 is configured to lock moveable arm 610 in the retracted position at altitudes above approximately 10,000 ft, or at other altitudes at which the external air pressure is sufficiently low to induce the expansion of bladders 657.

Instead of a pneumatic locking mechanism, a mechanical, electromechanical or hydraulic locking mechanism may be employed to lock movable arm 610 in the retracted position. The locking mechanism may be passively activated, for example by external environmental conditions, such as air pressure, or by active application of one or more actuators in response to an electrical control signal, for example.

More than one lighting apparatus 600 may be located on the underside of the fuselage, for example in the manner illustrated in FIG. 5. For example, one or more lighting apparatus 600 may be spaced apart along a forward-aft axis 602.

Figure 9:
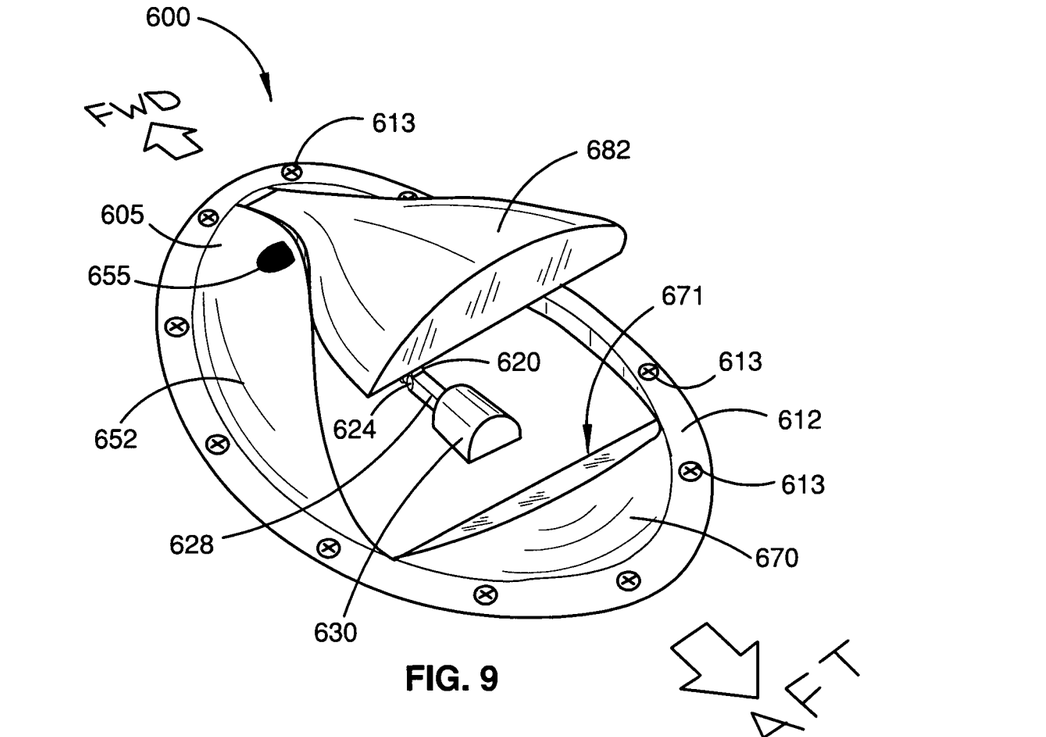
FIG. 9 is a perspective view of the lighting apparatus of FIG. 6, shown in an extended position.
Figure 10:
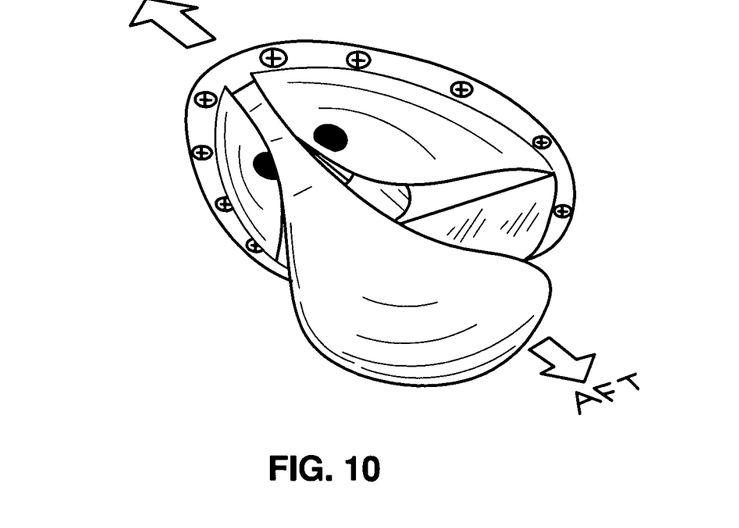
FIG. 10 is a perspective view of the lighting apparatus of FIG. 6, shown in an extended position and depicted as seen from beneath the fuselage of the aircraft.

As is illustrated in FIGS. 9 and 10, actuator 630 is positioned on or adjacent external surface 608 of the fuselage. FIGS. 9 and 10 also illustrate the position of the material 671 for vibration dampening or cleaning of the protective cover of light source 660. Material 671 is thus positioned to closely contact the exterior surface of the light head, including the protective cover, when moveable arm is in the retracted position. The perspective view of FIG. 9 is provided for ease of illustration to show the features of lighting apparatus 600, while the inverted perspective view of FIG. 10 is intended to illustrate lighting apparatus 600 as it would be seen when mounted on the underside of the fuselage of an aircraft.

Figure 14:
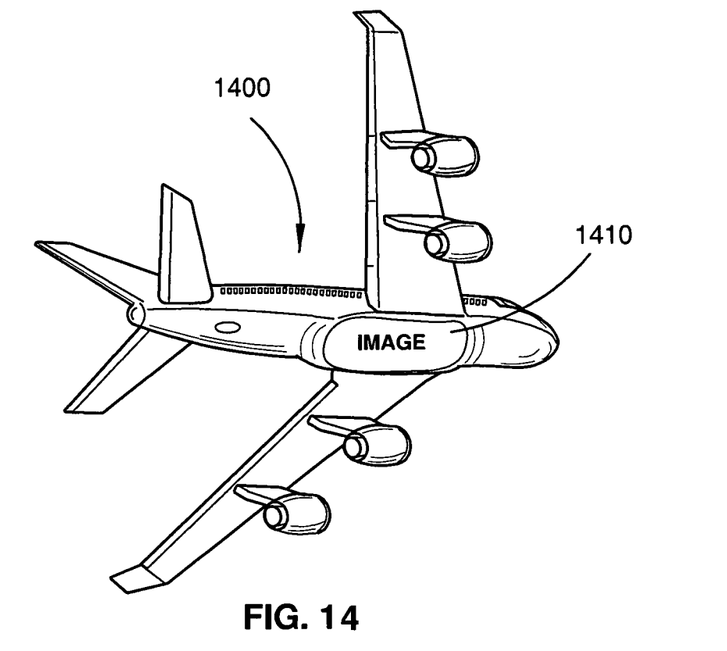
FIG. 14 is an illustration of an aircraft having an advertising image emanating from an underside of the aircraft fuselage.

Referring now to FIG. 14, there is illustrated an aircraft 1400 having an advertising image 1410 emanating from an underside of the aircraft fuselage. Advertising image 1410 may emanate by reflection of light, for example due to retroreflective properties of material on the aircraft from which the image is emanated, or image 1410 may be emanated by a luminescent material on aircraft 1400. The luminescent material may be phosphorescent or electroluminescent, for example.

Figure 15:
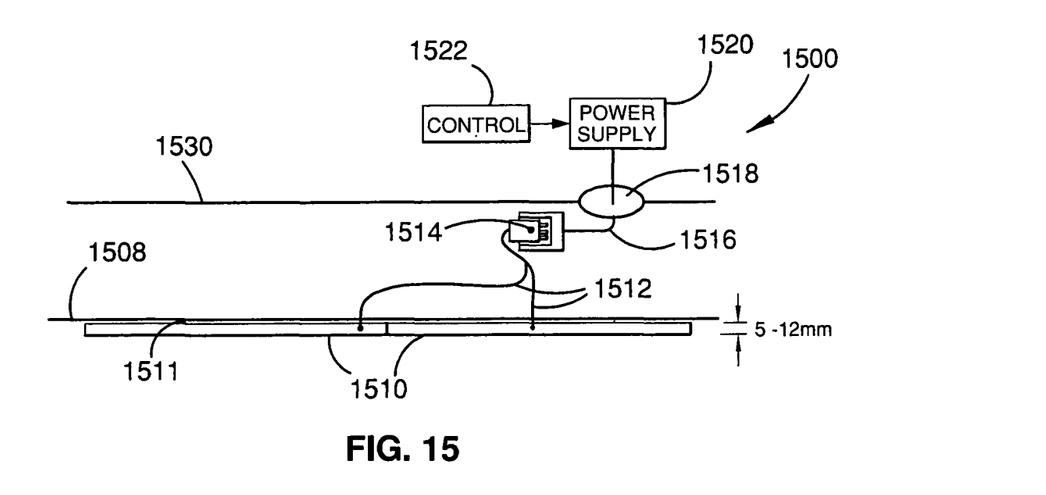
FIG. 15 is a schematic side-sectional diagram of an alternative lighting arrangement positioned on an underside of an aircraft fuselage.

FIG. 15 is a schematic illustration of a lighting apparatus 1500 according to alternative embodiments. Lighting apparatus 1500 comprises one or more electroluminescent panels 1510 disposed along a surface 1508 of the underside of a fuselage of an aircraft. Panels 1510 are configured to luminesce so as to emanate light and thereby project or illuminate an applied image. Luminescence of panels 1510 occurs upon suitable voltages being provided to panels 1510, for example via electrical conductors 1512 running between outer surface 1508 and pressure hull 1530 and connected to an electrical coupling 1514, which in turn is connected to a power supply 1520 via an electrical cable 1516. Electric cable 1516 passes through pressure hull 1530 at a pressure seal 1518. Power supply 1520 may be controlled by a control mechanism 1522 to provide power to electroluminescent panels 1510 to cause emanation of an advertising image, such as image 1410.

Control mechanism 1522 may comprise a suitable controller (not shown) and may comprise a manual switch located on an overhead panel 1605 within the cockpit 1600, as shown in FIG. 16. Control of power to electroluminescent panels 1510 may be operated using the same manual switches as those provided for switching on or off the aircraft external lights, such as navigation lights of the aircraft.

Electroluminescent panels 1510 may comprise prefabricated or design-to-suit panels, such as those marketed under the brand LumiFlux™. Electroluminescent panels 1510 may be about 5 mm to about 12 mm in thickness, for example, and may be adhered and/or otherwise affixed to the underside of the aircraft fuselage by a fixative layer or layers 1511.

According to the embodiments described herein, various lighting arrangements are illustrated and various means for emanating light from the underside of an aircraft fuselage are described. However, it is generally not intended to cause light to project appreciably in the forward direction of the aircraft, nor is it intended to project or emanate light in a manner so as to interfere with the light signals provided by the navigation lights of the aircraft. Further, although the described lighting apparatus generally intends to illuminate the underside of the aircraft fuselage, some illumination of the underside of the aircraft wings may occur adjacent to the fuselage, adjacent engine nacelles and adjacent general wing protrusions.

Although lighting arrangements have been described herein with reference to illumination of an aircraft, such lighting arrangements may also be used for illumination of surfaces of other vehicles, such as trains, ships or other vehicles with highly visible surface areas. Such illumination may be for the purpose of causing an advertising image on the illuminated surface to be visible or for merely making the surface itself more visible.

The embodiments are described herein by way of example, with reference to the drawings. However, modifications of the described embodiments may be apparent to those skilled in the art, without departing from the spirit and scope of the described embodiments. The described embodiments are therefore intended to be exemplary and non-limiting when considered in the context of the appended claims.

The claims defining the invention are as follows:

1. An aircraft comprising:
   a fuselage, the fuselage includes a cockpit;
   a set of wings connected to the fuselage;
   an image formed on the underside of the fuselage, the image includes retroreflective material;
   an apparatus that illuminates the image on the underside of the fuselage, the apparatus includes:
   a plurality of aerodynamically ergonomic housings mounted at longitudinally spaced locations to an underside of the fuselage, wherein each housing includes a curved portion that protrudes away from the fuselage, and a flange-like portion by which the housing is mounted onto the fuselage; and wherein at least a portion of the curved portion increases in cross-section in an aft direction;
   a light source disposed outside the fuselage within each of the housings, each housing directs a majority of light from the respective light source toward the underside of the fuselage in the aft direction to produce an illuminated area on the fuselage that illuminates the image on the underside of the fuselage, the illuminated area produced by the light source disposed within a first housing of the plurality of housings overlapping the illuminated area produced by the light source disposed within a second housing of the plurality of housings, the second housing being positioned within the illuminated area produced by the light source disposed within the first housing;
   a power supply coupled to each of the light sources via a switch actuatable from the cockpit of the aircraft;
   each light source is adjustably mounted; and
   an adjustment mechanism associated with each light source that adjusts an angle of projection of the respective light source.

2. The aircraft of claim 1, wherein the first housing is mounted at a location forward of the set of wings on the underside of the fuselage, and at least a portion of the second housing is disposed at a location behind the wings, and wherein the first and second housings are parallel to one another.

3. The aircraft of claim 1, wherein the light source comprises a white light source.

4. The aircraft of claim 1, wherein the light source comprises a plurality of light-emitting diodes (LEDs).

5. The aircraft of claim 1, comprising at least two of the first housings and at least two of the second housings, wherein a distance between the first housings is greater than a distance between the second housings, and wherein the first housings are not positioned on the image and the second housings are positioned on a portion of the image.

6. The aircraft of claim 5, wherein switch is configured to switch the light source to an on state in response to a signal to switch on other external lights of the aircraft.

7. The aircraft of claim 6, wherein the switching control component is configured to strobe the light source in the on state.

8. The aircraft of claim 1, wherein the housing has a light-transmissive protective cover through which the light source is projected.

9. The aircraft of claim 8, further comprising an optical arrangement positioned intermediate the light source and the protective cover for focusing light from the light source toward the underside of the fuselage.

10. The apparatus of claim 1, wherein each light source is pivotally mounted in the respective housing, and wherein the adjustment mechanism comprises a screw that is accessible from an exterior of the respective housing.

11. The aircraft of claim 1, wherein the adjustment mechanism can adjust the angle of projection of the light source within a range more or less toward the underside of the fuselage.

12. The aircraft of claim 1, wherein the first and second housings are positioned at a location that is an equal distance from the set of wings.

13. An aircraft advertising system, comprising:
    a graphical advertisement applied to an underside of an aircraft fuselage, the advertisement includes retroreflective material; and
    a plurality of lighting devices, each lighting device comprising;
    an aerodynamically ergonomic housing fixedly mounted to an underside of the fuselage, wherein the housing includes a curved portion that protrudes away from the fuselage, and a flange-like portion by which the housing is mounted onto the fuselage;
    a light source disposed outside the fuselage within the housing, at least a portion of each housing increasing in cross-section in an aft direction, each housing being configured to direct a majority of light from the light source toward the underside of the fuselage in the aft direction to produce an illuminated area on the graphical advertisement, the illuminated area produced by a first lighting device of the plurality of lighting devices overlapping the illuminated area produced by a second lighting device of the plurality of lighting devices, the second lighting device being positioned within the illuminated area produced by the light source disposed within the first housing;
    a power supply coupled to the light source via a switch actuatable from a cockpit of the aircraft; and
    the light source is adjustably mounted; and
    an adjustment mechanism associated with each light source that adjusts an angle of projection of the respective light source.

14. An aircraft advertising arrangement, comprising:
    light emanation means that causes light to emanate from an underside of an aircraft fuselage, the light emanation means emanates light as a graphical advertisement image; and
    a plurality of aerodynamically ergonomic housings mounted to protrude away from the underside of the aircraft fuselage, wherein each housing includes a curved portion that protrudes away from the fuselage, and a flange-like portion by which the housing is mounted onto the fuselage, at least a portion of each curved portion increasing in cross-section in an aft direction, the housings being configured to direct a majority of the emanated light toward the underside of the fuselage in the aft direction to produce an illuminated area on the fuselage, the illuminated area produced by the light directed from a first housing of the plurality of housings overlapping the illuminated area produced by the light directed from a second housing of the plurality of housings, the second housing being positioned within the illuminated area produced by the light source disposed within the first housing;

wherein the light emanation means includes an electroluminescent light source and a power source that supplies power to the electroluminescent light source via a switch actuatable from a cockpit of the aircraft;

wherein the light emanation means includes an adjustment mechanism associated with each light emanation means that adjusts an angle of projection of the respective light emanation means; and wherein the light emanation means further directs light onto a retroreflective material that is disposed on the underside of the fuselage.

15. The arrangement of claim 14, wherein the switch also controls supply of power to other external lights of the aircraft.

16. The arrangement of claim 14, further comprising a controller responsive to the switch for controlling strobing of the light emanation means.

17. The arrangement claim 14, wherein the light emanation means comprises a phosphorescent material.

18. A method of advertising, comprising:
directing light toward an underside of an aircraft fuselage in an aft direction through a plurality of aerodynamically ergonomic housings mounted to protrude away from the underside of the fuselage, wherein each housing includes a curved portion that protrudes away from the fuselage, and a flange-like portion by which the housing is mounted onto the fuselage, at least a portion of each housing increasing in cross-section in the aft direction, and each housing being configured to direct a majority of light from the respective light source toward the underside of the fuselage to produce an illuminated area on the fuselage, the illuminated area produced by the light source disposed within a first housing of the plurality of housings overlapping the illuminated area produced by the light source disposed within a second housing of the plurality of housings, the second housing being positioned within the illuminated area produced by the light source disposed within the first housing, the respective housings associated with each light source include an adjustment mechanism that adjusts an angle of projection of the respective light source and the light emanating as a graphical advertisement image;
and directing the light onto a retroreflective material on the underside of the fuselage.

19. A method of advertising, comprising:
causing light to emanate from an underside of an aircraft fuselage, the light emanating as a graphical advertisement image;

wherein the method is performed using the arrangement of claim 14.

20. An aircraft comprising the advertising arrangement of claim 14.

* * * * *